(Model.)

6 Sheets—Sheet 1.

A. J. CALHOUN.
COMBINATION LOCK.

No. 335,337. Patented Feb. 2, 1886.

WITNESSES:
INVENTOR:
A. J. Calhoun
BY Munn & Co
ATTORNEYS.

(Model.)
6 Sheets—Sheet 2.
A. J. CALHOUN.
COMBINATION LOCK.
No. 335,337. Patented Feb. 2, 1886.
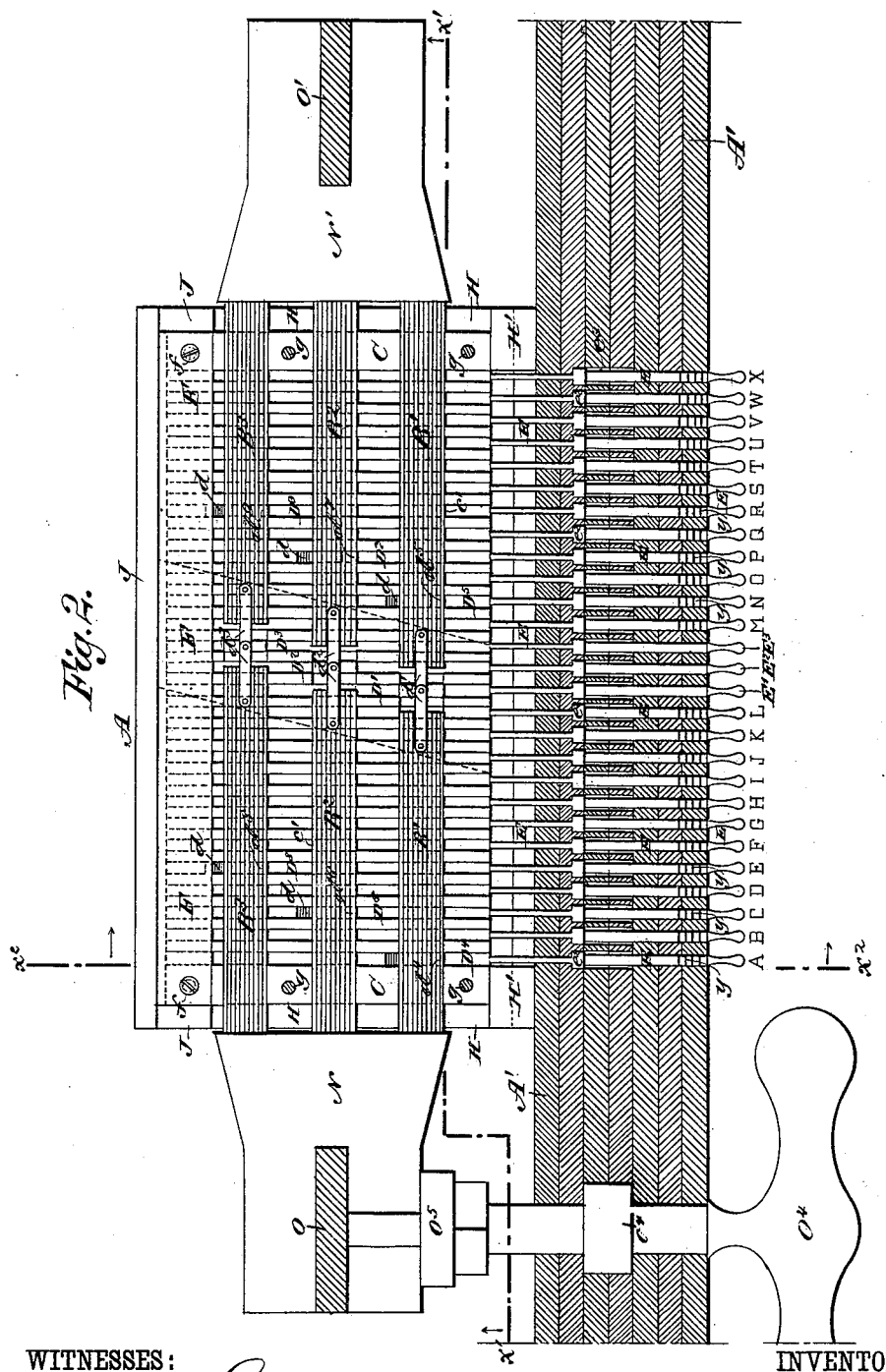
WITNESSES:
INVENTOR:
A. J. Calhoun
BY Munn & Co
ATTORNEYS.

(Model.)
A. J. CALHOUN.
COMBINATION LOCK.
No. 335,337. Patented Feb. 2, 1886.
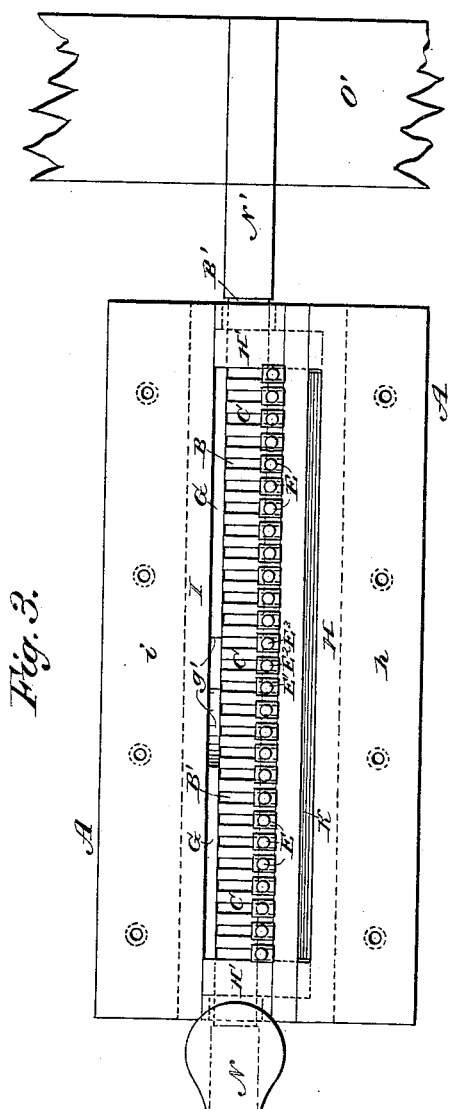
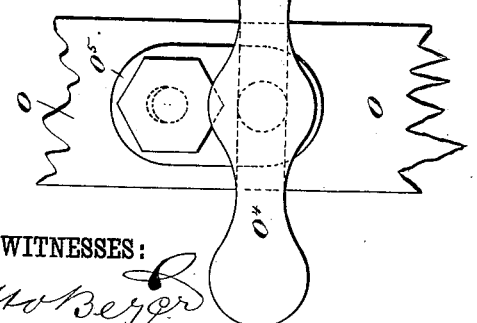
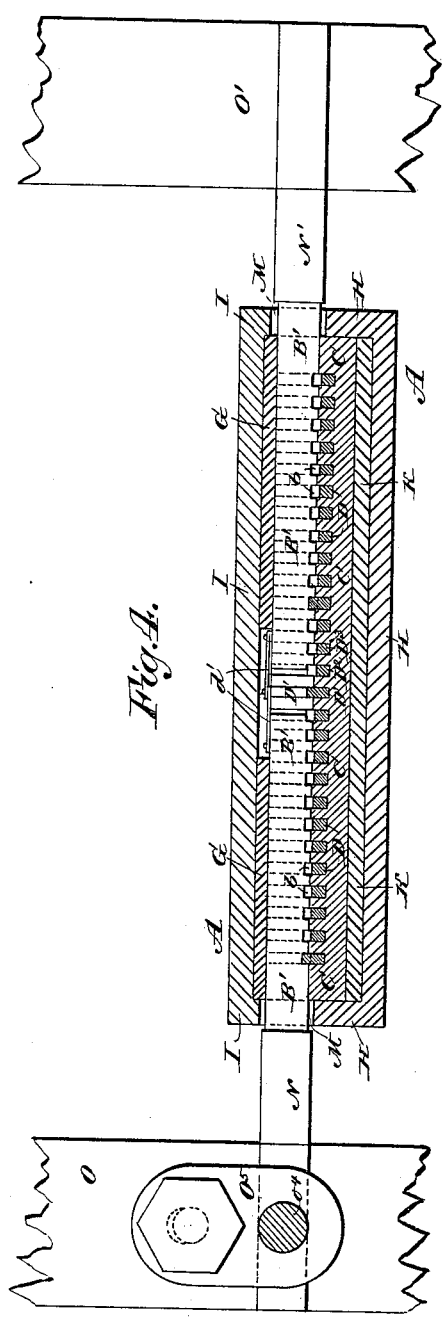
WITNESSES:
H. W. Berger
C. Sedgwick
INVENTOR:
A. J. Calhoun
BY Munn & Co.
ATTORNEYS.

(Model.)

A. J. CALHOUN.
COMBINATION LOCK.

No. 335,337. Patented Feb. 2, 1886.

WITNESSES:

INVENTOR:
A. J. Calhoun
BY Munn & Co.
ATTORNEYS.

(Model.)
A. J. CALHOUN.
COMBINATION LOCK.
No. 335,337. Patented Feb. 2, 1886.
6 Sheets—Sheet 5.
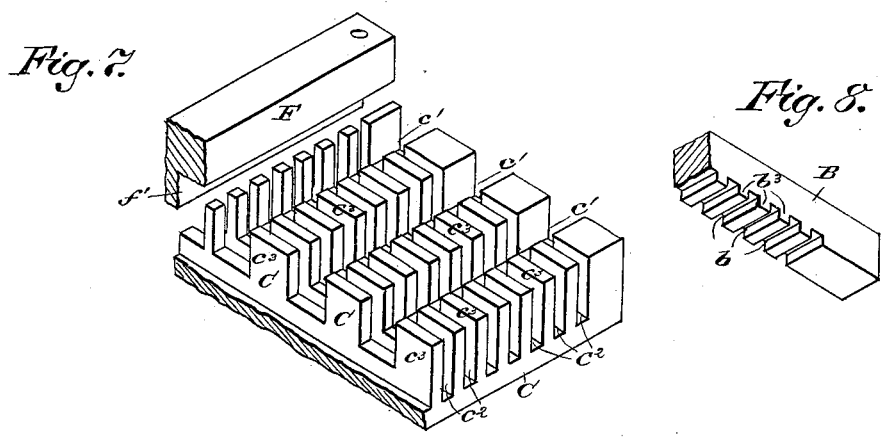
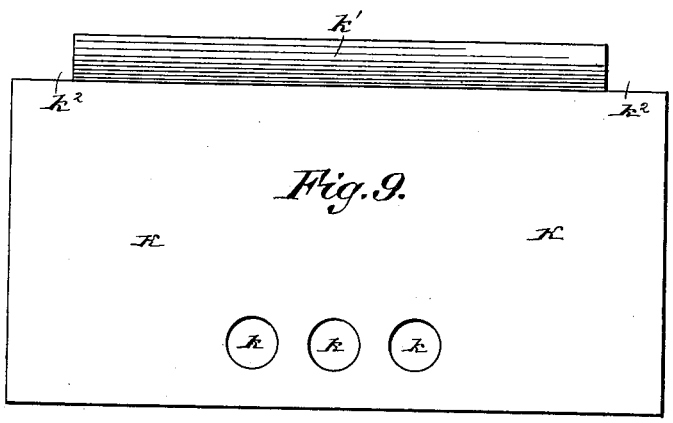
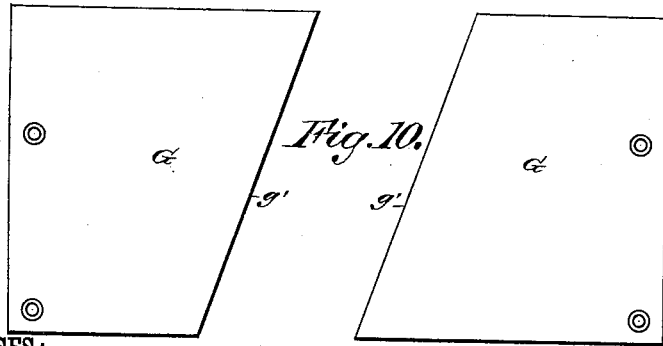
WITNESSES:
INVENTOR:
A. J. Calhoun
BY Munn & Co
ATTORNEYS.

(Model.)

6 Sheets—Sheet 6.

A. J. CALHOUN.
COMBINATION LOCK.

No. 335,337.

Patented Feb. 2, 1886.

WITNESSES:

INVENTOR:
A. J. Calhoun
BY Munn & Co.
ATTORNEYS.

UNITED STATES PATENT OFFICE.

ANDREW JACKSON CALHOUN, OF SOCORRO, TERRITORY OF NEW MEXICO.

COMBINATION-LOCK.

SPECIFICATION forming part of Letters Patent No. 335,337, dated February 2, 1886.

Application filed May 2, 1885. Serial No. 164,231. (Model.)

*To all whom it may concern:*

Be it known that I, ANDREW JACKSON CALHOUN, of Socorro, in the county of Socorro and Territory of New Mexico, have invented a new and Improved Combination-Lock, of which the following is a full, clear, and exact description.

My invention relates to combination-locks designed more especially for vault or safe doors, and has for its object to provide a lock which may easily be operated, and will afford ample security against the opening of the door by unauthorized persons.

The invention consists in a lock comprising a key-frame slotted lengthwise to receive one or more notched bolts, and slotted transversely to receive notched keys, which remain in the lock and are adapted to slide through the notches of the bolts, together with a suitable casing inclosing the key-frame, and key-stems fitted in the vault or safe door to which the lock is applied, and adapted to be engaged with and disconnected from the keys.

The invention consists, also, in particular constructions and combinations of parts of the lock, whereby the keys may with facility be connected with and disconnected from the key-stems, and the key-frame may be removed for access to the keys for changing the combination, all as hereinafter fully described and claimed.

Reference is to be had to the accompanying drawings, forming part of this specification, and in which—

Figure 1:
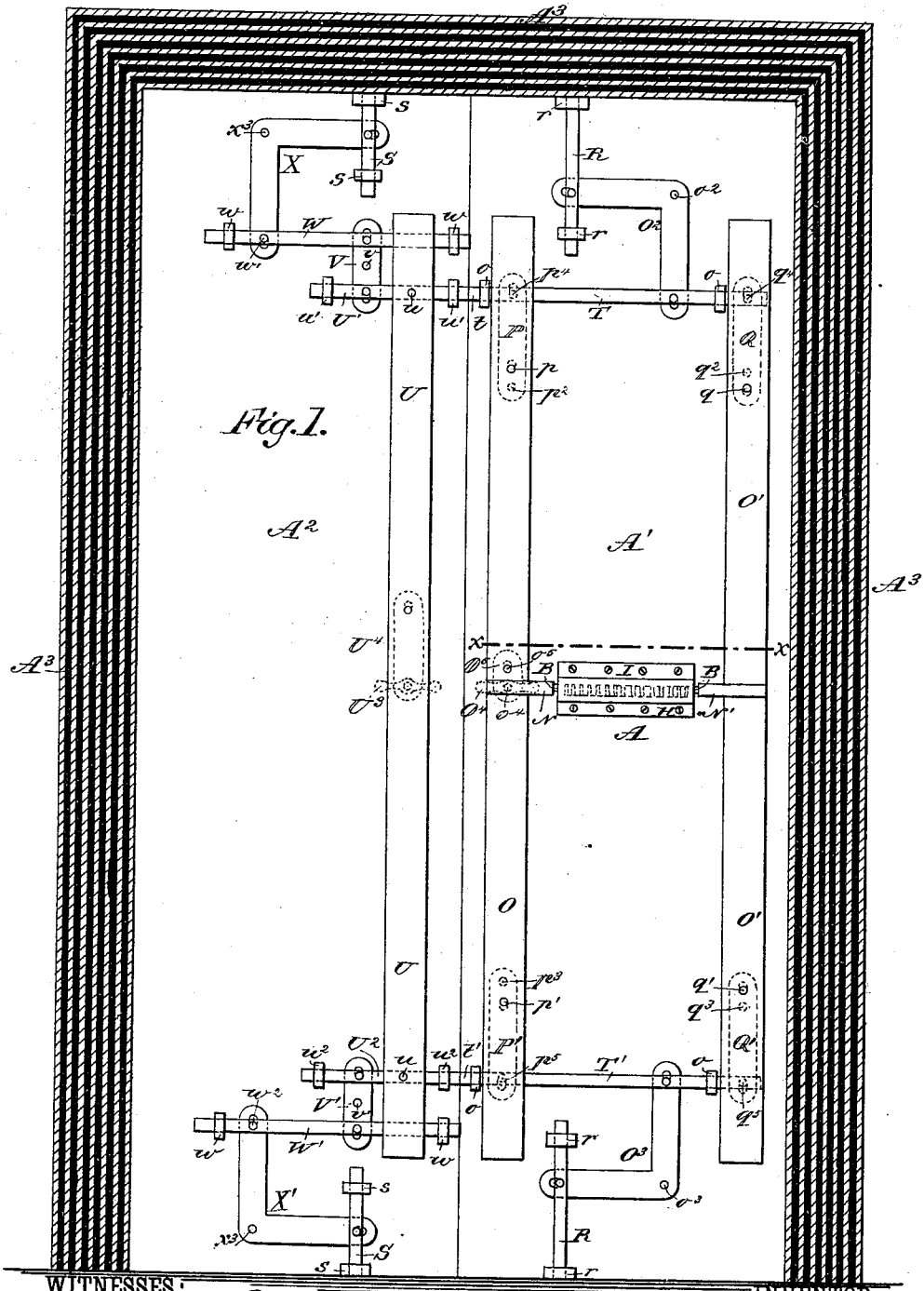
Figure 5:
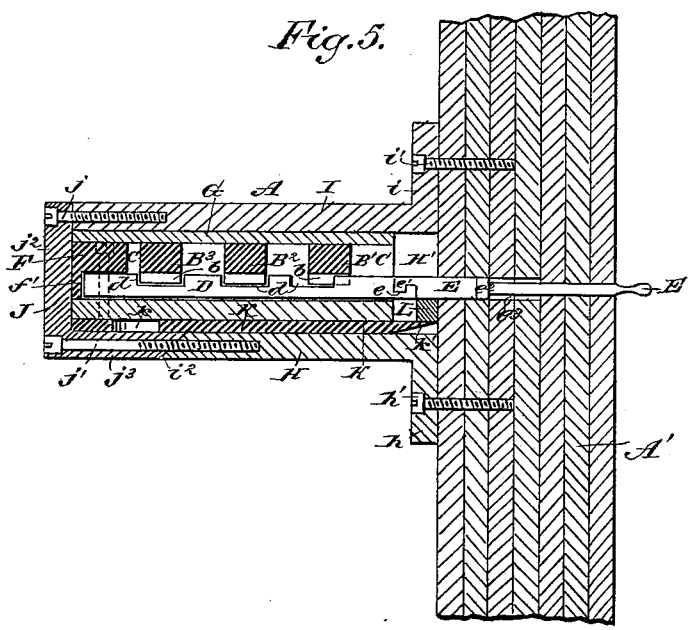
Figure 6:
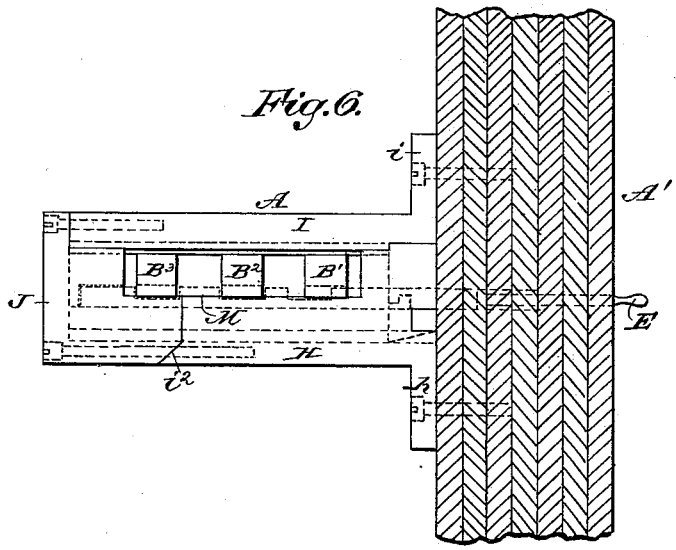
Figure 11:
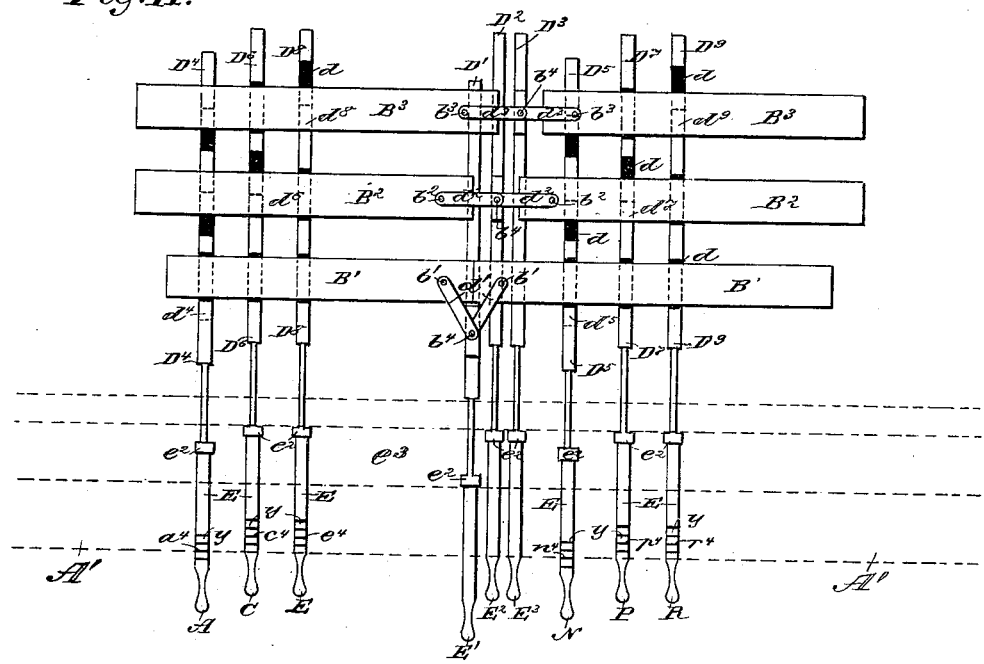
Figure 12:
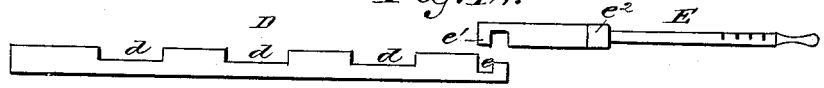

Figure 1 is an inside view of a pair of vault-doors with my improved combination-lock applied to one of the doors and adjusted to hold the bolt-works for locking the doors. Fig. 2 is an enlarged horizontal section, taken on the line $x\ x$, Fig. 1, through the vault-door and bolt-works, and with the top plate of the lock removed. Fig. 3 is a front view of the lock and adjacent parts of the bolt-works removed from the vault-door. Fig. 4 is a front vertical sectional elevation of the lock and bolt-works, taken on the line $x'\ x'$, Fig. 2. Fig. 5 is a vertical sectional side elevation of the lock and vault-door, taken on the line $x^2\ x^2$, Fig. 2. Fig. 6 is an end view of the lock with the vault-door in vertical section. Figs. 7, 8, 9, and 10 are detail views of parts of the lock. Fig. 11 is a diagram illustrative of the action of the lock-bolts, the bolt-keys, and some of the combination-keys, and with the vault-door plates indicated in dotted lines; and Figs. 12, 13, 14, and 15 are detail side views of a few of the lock-keys.

The letter A indicates the lock, which is represented in some of the drawings as attached to a vault-door, A', which, with the adjoining door $A^2$, closes the end of a vault, the top and side walls of which are shown at $A^3$ in Fig. 1.

I first will describe the construction of the lock, next its operation, and finally its relative arrangement with the bolt-works of the vault-doors.

The working parts of the lock consist, mainly, of one or more bolts, designated generally by the letter B, and comprising, preferably, a series of three aligned pairs of bolts, $B'\ B^2\ B^3$, which are fitted to slide in longitudinal slots or grooves $c'$ of a frame, C, and a series of keys, designated generally by the letter D and working beneath the bolts B, and at about right angles thereto, in transversely-ranging grooves $c^2$ of the frame C. (See Figs. 3 and 7.) The bolts B have a series of transverse notches, $b$, in their under faces or sides, as in Figs. 4, 5, and 8, and the keys D have transverse notches $d$ in their upper faces or sides. (See Figs. 2, 5, and 11 to 15, inclusive.)

The keys D are divided into three classes, which I call, respectively, "bolt" keys, "combination" keys, and "blank" keys. The bolt-keys are those by which the bolts are shifted lengthwise, and which I shall specially refer to by the letters $D'\ D^2\ D^3$, which three bolt-keys, as shown, are connected, respectively, to the aligned pairs of bolts $B'\ B^2\ B^3$ by pairs of toggle-links $d'\ d^2\ d^3$, respectively, which are connected, one of each pair, by separate pins $b'\ b^2\ b^3$, with the inner ends of the aligned pairs of bolts, and at their other ends each pair of toggle-links are connected by a pin, $b^4$, with the bolt-key operating the pair of bolts with which the links are connected. (See Figs. 2, 4, and 11.) The combination-keys are those which have to be set or drawn out from or in the grooves $c^2$ of frame C a certain distance to bring their notches $d$, or, rather, certain of the tongues between the notches, into positions to allow the bolts B to be moved freely along the frame-groove $c'$ by the bolt-keys connected to them. The blank-keys are those which do not enter into the combination at which the lock may at any time be set to open, and said blank keys are not to be moved endwise while setting the lock for allowing the bolts to be moved endwise in or out, as hereinafter more fully explained. Each of the keys D has a notch, $e$, formed near its outer end at the upper side, which notch is to be engaged with or by a tongue, $e'$, at the end of an extension key stem or bar, the said key-stems being herein generally referred to by the letter E, and which stems project through the vault or safe door, and may be grasped from the outside of the door by their end knobs for moving the lock-keys as may be required, and the stems E have enlargements or collars $e^2$, which travel in a slot, $e^3$, formed by recessing or cutting away parts of the vault-door, the contact of the collars $e^2$ with the opposite end shoulders, formed around the key-stem bearings by the slots, limiting the outward movement of the key-stems to prevent their withdrawal, and also limiting the inward movement of the key-stems, so their tongues $e'$ will come into line along the lock for engaging the notches $e$ of the keys D when the key-frame, with its keys, is placed in the lock-case after being removed therefrom to change the combination, as hereinafter more fully explained.

Along the rear edge of the key-frame C is secured by screws $f\,f$ the bar F, which is rabbeted at the under side to receive the inner ends of the keys D, and overlap the keys to hold them down to place, the part $f'$ of bar F preventing the keys from dropping from the back of the key-frame when it is removed from the lock-casing.

Over the top of the key-frame C are secured by screws $g$ the plates G G, the inner ends, $g'$, of which are separated and shaped suitably to give space between them for the bolt-operating toggle-links $d'\ d^2\ d^3$, said plates G G being shown in Fig. 10, and their ends $g'$ are indicated in dotted lines in Fig. 2.

The key-frame C, its keys D, the bar F, and the plates G G constitute the movable portion or body of the lock, which is contained in a sectional casing consisting of a bottom plate, H, which is flanged at $h$, so that screws $h'$ may be passed through the flange $h$ into the vault or safe door A', an upper or top plate, I, flanged at $i$, so that screws $i'$ may be passed through the flange into the vault or safe door A', and a back plate, J, which is held by screws $j\,j'$ to the top and bottom plates, H I, so as to be removed therefrom to allow the key and bolt-frame C to be taken out. I prefer to make the plate J in angular cross-section form, so that its part $j^2$ forms the back proper, and its part $j^3$ forms part of the bottom of the lock-casing, so that when the plate J is removed the fingers may be passed into the holes $k$ of the key-disconnecting plate K—which is placed in the lock-case under the key-frame C—to withdraw said plate K from under the key-frame and permit the frame to drop onto the bottom plate, I, of the lock-case, which movement will withdraw or disconnect the keys D from the key-stems E, and the key-frame and keys may then be drawn out from the casing. The forward edge of the disconnecting-plate K is beveled at $k'$, and the back edge of the bottom plate, H, is beveled at $i^2$, to facilitate the insertion of the disconnecting-plate between the key-frame C and said plate H when the key-frame and plate K are to be replaced in the casing.

The letter L indicates a bar which is secured to the inner plate or face of the vault or safe door A', and is of such size that its upper edge is level with the bottom or lower faces of the keys D and their stems E, and its rear face will line with the front extremities of the keys D. The bar L serves to guide the keys D so they will all simultaneously interlock with their respective key-stems E, as it is obvious that when the key-frame is slipped into the lock-casing the forward ends of the keys D will strike the bar L to line the keys endwise, and when the plate K is fully pushed in the keys will be lifted, so as to engage the stems E, which had previously been aligned endwise by pushing them back as far as they would go, and as will be understood from Fig. 5 of the drawings.

The bottom plate, H, of the casing has an upwardly-projecting lug, H', at each end, which lugs form stops to limit the forward movement of the key-frame in the case, and the inner corners of plate K are cut away, as at $k^2$, Fig. 9, to fit around these lugs when the plate is fully pushed in.

The bottom, top, and back plates, H I J, have end parts between which the key-frame fits snugly endwise, and the casing fits the key-frame edgewise and the key-frame and disconnecting-plate flatwise, so that the key-frame will have little or no looseness or play in any way in the casing. The ends of the casing are cut away to form openings, as at M, into and through which the ends of the bolts B' B² B³ may pass.

All parts of the lock above described will be made of metal, and the shifting parts will be neatly fitted for exactness of movement.

The operation of the lock is as follows: When the bolts B' B² B³ are either projected, as represented in Figs. 2, 3, and 4, or drawn back, as represented, for bolt B' in Fig. 11, the notches $b$ of all the bolts B will come into line with the grooves $c^2$ in the key-frame C, so that all the keys—except the bolt-keys D' D² D², which are held to the bolts by the links $d'\ d^2\ d^3$—will be free to move along their respective grooves $c^2$, as the teeth or partitions $b^3$ between the notches $b$ of bolts B then will stand in line transversely of the lock, with the teeth or tongues $c^3$ between the key-slots $c^2$ of the key-frame.

The lock shown has twenty-seven keys D, the key-stems of which I have lettered in Fig. 3, beginning at the left-hand side, as follows: From letters A to L, inclusive. Then come the key-stems E' E² E³ of the bolt-keys D' D² D³, respectively, and following these the key-stems are lettered from M to X, inclusive.

The lock is set to open by a very simple combination of the keys D—that is to say, but two keys, D, enter into the combination for each aligned pair of bolts B, or one key for each bolt—but it is evident that two, three, or more of the keys may comprise the combination for each separate bolt of the lock. By way of illustration, I have chosen the two keys whose stems are lettered A N as the combination-keys for the first pair of bolts, B' B', and the keys whose stems are lettered C P as the combination-keys for the second pair of bolts, $B^2$ $B^2$, and the keys whose stems are lettered E R as the combination-keys for the third pair of bolts, $B^3$ $B^3$. All the other keys D—excepting the bolt-keys D' $D^2$ $D^3$, having stems E' $E^2$ $E^3$—are blank keys, (see Fig. 12,) the equidistant notches $d$ of which, when the keys are pushed fully inward or backward, will align all along the lock with all the bolt-grooves $c'$, and will not then prevent free movement of the bolts; but if at any time any one or more of the blank keys should be drawn out even a trifling distance the tongues between the notches $d$ of said withdrawn keys will be moved more or less across the bolt-grooves $c'$, so as to enter the notches $b$ of the bolts more or less and prevent endwise movement of the bolts either way. Hence it follows that if all the blank keys are not fully pushed in the bolts cannot be moved, even if the combination-keys be properly worked, and as any one or more of the blank keys are likely to be drawn out by persons not knowing the combination of the lock, it would be very difficult for them to open the vault or safe, even if but a single bolt, B, or one aligned pair of said bolts, be used in the lock, and with two, three, or more bolts or aligned pairs of bolts set to varied combinations of the keys the opening of the vault by an unauthorized person would be quite impossible.

I now will describe the working of the combinations of the lock with particular reference to Fig. 2, which shows the combination-keys in proper relative positions, and to the diagram, Fig. 11, wherein the bolts, bolt-keys, and combination-keys are grouped together. We will suppose the bolts B' $B^2$ $B^3$ are projected, as in Figs. 2, 3, and 4, and it is desired to withdraw the bolts to allow the bolt-works of the vault or safe door to be operated for drawing the main locking bolts of the door from its casing to permit opening of the door. It must be remembered that all the combination and blank keys are free to move through the notches $b$ of either or all of the bolts B' $B^2$ $B^3$ when the bolts are either fully projected or fully drawn back; hence, as shown in Fig. 2, all the key-stems E and keys D will be free to move outward and inward, except the stems E' $E^2$ $E^3$ and the bolt-keys D' $D^2$ $D^3$, connected to these stems. To withdraw the bolts the stems A N are first pulled out until marks $a^4$ $n^4$ on them come into line with the outer face of the vault-door, which movements will draw out the combination-keys $D^4$ $D^5$, connected to stems A N, so that the inner parts $d^4$ $d^5$ of their forward tongues, (indicated in dotted lines in Fig. 11,) which parts before withdrawal of the keys had stood within their respective notches, $b$, of the bolts B', will be drawn out of the said bolt-notches, whereupon the stem E' may be pulled out to withdraw bolt-key D' and draw on links $d'$ $d'$ to draw back both bolts B' B', as shown in Fig. 11. By pulling out the keys $D^4$ $D^5$ by stems A N, as above described, the two back or inner sets of tongues of said keys had been set across the notches $b$ of the other two pairs of bolts $B^2$ $B^3$; hence before either of these pairs of bolts can be moved the key-stem A N must be pushed fully inward again, which is done. The key-stems C P next are to be drawn outward to marks $c^4$ $p^4$ on them, which will draw out the combination-keys $D^6$ $D^7$, respectively, so that the inner parts $d^6$ $d^7$ of the central tongues of these keys, which in Fig. 11 stand across the notches $b$ of bolts $B^2$ $B^2$, in which these keys slide, will then be drawn out of the bolt-notches to allow the bolts to be drawn back by pulling out the key-stem $E^2$, which is connected by links $d^2$ $d^2$ to the bolt-key $D^2$, and the key-stems C P and keys $D^6$ $D^7$ then will be pushed fully inward to allow bolts $B^3$ $B^3$ to be moved. The key-stems E R now will be drawn out to marks $e^4$ $r^4$ on them, which will draw out the combination-keys $D^8$ $D^9$, so that the parts $d^8$ $d^9$ of their rear or inner tongues, which in Fig. 11 stand across the notches $b$ of bolts $B^3$ $B^3$, in which these keys slide, will be clear of the notches $b$ to allow these bolts to be drawn back by pulling out the key-stem $E^3$, which is connected by links $d^3$ $d^3$ to the bolt-key $D^3$, and the key-stem E R and keys $D^8$ $D^9$ then will be pushed fully inward. When all the bolts B have been withdrawn from the lugs N N', fixed to the bars O O' of the bolt-works, the bolt-works on both doors may be operated to draw the main bolts R S from the vault or safe door casing, as presently explained.

Figure 13:
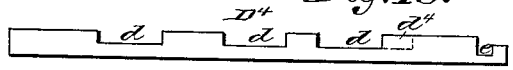
Figure 14:
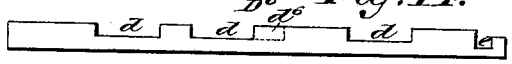
Figure 15:
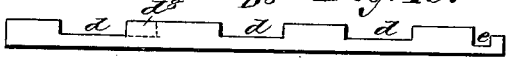

Figs. 13, 14, and 15 show, respectively, the combination-keys $D^4$ $D^6$ $D^8$, with their tongue portions $d^4$ $d^6$ $d^8$, respectively, (indicated by dotted lines,) and the tongue portions $d^5$ $d^7$ $d^9$ of keys $D^5$ $D^7$ $D^9$ have the same relative positions lengthwise of the keys, so that the two keys forming the combination for each aligned pair of bolts B will be drawn outward a like distance to allow the bolts to be shifted endwise; but the arrangement of the key-tongues and notches may be varied for every separate key entering into the combination for any one of the bolts, the key-stems being marked to indicate the extent to which the keys are to be drawn out to carry their tongues clear of the bolt-notches.

To throw the bolts outward to prevent shifting of the bolt-works for drawing the main bolts R S from the door-casing, it is preferred to operate the combination-keys D and bolts B in the reverse order to that above described for withdrawing the bolts, viz: First pull key-stems E R, and then push in key-stem $E^3$ for projecting the bolts $B^3$ $B^3$, and then push in stems E R; next pull key-stems C P, and then push in key-stem $E^2$ for projecting bolts $B^2$ $B^2$, and then push in stems C P; and, finally, pull key-stems A N, and then push in key-stem E' for projecting bolts B' B', and then push in stems A N, it being understood that the combination-keys are pulled out until their respective marks $e^4 r^4$, $c^4 p^4$, and $a^4 n^4$ line as before with the outer face of vault or safe door. It is quite impossible to set the combination-keys by the sense of feeling or hearing.

It is evident that the lengths and positions of the notches $d$ of the combination-keys may vary so as to require varied extent of movement of the keys to allow the bolts B to pass by them, and it will be understood that all of the key-stems will have a series of marks or notches to indicate the varying distances they are to be drawn outward to set the combination-keys, which may be connected to the stems according to the location of the notches $d$ of the keys, said marks for the combinations above described being indicated at $y$ on the key-stems in Figs. 2 and 11.

In changing the combination for either one or all of the bolts B it only is necessary to change the relative positions of the combination-keys and blank keys so as to connect the same combination-keys to different stems E; or differently-notched combination-keys may be substituted in the same places. The keys are changed by sliding them in or out of grooves $c^2$ from the front of the key-frame when the frame is removed from the casing.

The person or persons operating the lock are to remember which marks of the key-stems connecting with the several combination-keys are to be brought into line with the front face of the safe-door, in order properly to position the combination-keys to allow movement of the bolt or bolts with which these keys connect.

The keys may easily be set by persons knowing the combination, but it will be quite impossible for others to set them for drawing the bolts B to open the safe door.

It is obvious that the combinations at which the lock may be set are or may be quite unlimited, and more particularly is this the case when a series of two, three, or more of the key-frames C, having bolts and keys, as above described, are fitted in a suitable frame-work or support on the inside of the vault or safe door, so that the bolts of each key-frame will act against stop-lugs on the bolt-works, as may be done; but ordinarily a single key-frame, C, with three sets of bolts, B, as shown, and above described, and with the great variety of combinations possible with it, will afford good security against opening of the vault or safe by unauthorized persons, and with this "three-bolt" key-frame each of three individuals may hold one of the combinations unknown to the other two persons, thus preventing the opening of the safe or vault except by concurrence of the three person, which at times may be desirable.

The key-stems E, may be lengthened or shortened to correspond with thicker or thinner vault or safe doors to which the lock may be applied, and the length of the toggle-links connecting the bolt-keys with the bolts, and also their point of connection with the bolts, may be varied to suit any desired throw or endwise movement of the bolts B, a bolt movement of one-quarter of an inch being preferred in practice.

I describe the bolt-works, as follows: The bars O O', to which the opposite lugs, N N', are attached, range vertically at the inside of the door A'. The bar O has pin-and-slot connections at $p p'$ with the links P P', respectively, (dotted,) which links are pivoted at $p^2 p^3$, respectively, to the door A', and these links have pin-and-slot connections at $p^4 p^5$, respectively, with the upper and lower bolt-bars, T T', which are fitted to slide in eyes $o$, fixed to the door A. The bar O' has pin-and-slot connections at $q q'$ with the links Q Q', respectively, and these links are pivoted to the door A' at $q^2 q^3$, and have pin-and-slot connections at $q^4 q^5$ with the bolt-bars T T', respectively.

At $O^2$ $O^3$ are shown angle-levers, which are pivoted to the door A' at $o^2 o^3$, and have pin-and-slot connections at opposite ends with the bolt-bars T T' and opposite upper and lower main bolts, R, which are guided in eyes $r$, fixed to door A', and in the door is fitted the shaft $o^4$, on one end of which the handle $O^4$ is fixed, and at its other end is fixed the link or bar $O^5$, which has pin-and-slot connections at $o^5$ with the bar O. With this construction, and when the bolts B of the lock A are withdrawn to allow it, if the handle $O^4$ is turned outward, the bars O O' will be moved toward each other, and the bolt-bars T T' will be moved back toward the hinges of the door, and the angle-levers $O^2$ $O^3$ will be swung to draw the bolts R R from the door-casing, and at the same time the ends $t$ $t'$ of bolt-bars T T' will be carried back, so as to allow the bolt-works of door $A^2$ to be operated.

The bolt-works of door $A^2$ consist of a vertically-ranging bar, U, which is connected at $u$ $u$ to upper and lower bolt-bars, U' $U^2$, aligned with the bolt-bars T T' of door A' when the doors are closed, and the bars U' $U^2$ have pin-and-slot connections with the one end of links V V', which are pivoted centrally at $v$ $v'$ to the door $A^2$, and at their other ends have pin-and-slot connections to bars W W', which are fitted to slide in eyes $w$, fixed to door $A^2$, and the bars W W' have pin-and-slot connections at $w' w^2$ with the one end of angle-levers X X', which are pivoted at $x^3$ to the door $A^2$, and the levers have pin-and-slot connections at their other ends with the opposite bolts, S S, which slide in eyes $s$, fixed to door $A^2$. The bars U' $U^2$ slide in eyes $u' u^2$, fixed to the door $A^2$. With this construction, when the bar U is moved outward by means of its handle U³ and link U⁴, the bars U' U² will be moved outward and the bars W W' will be moved inward, and the levers X X' will be operated to draw the bolts S S from the door-casing. As the bars U' U² cannot be moved outward until the bars T T' are moved back, and as this cannot be done until the bolts B of lock A are withdrawn from the lugs N N' of bars O O', it is evident that when the lock-bolts B are projected the vault or safe doors cannot be opened.

I do not limit myself to the use of the toggle-links d' d² d³ for moving the bolts B of lock A by the aid of the bolt-keys and their stems, as other devices—such as, for example, a plate having diverging slots engaged by pins on the aligned bolts and connected to the bolt-key—may be used; but the toggle-links are at present preferred for the purpose.

As hereinbefore intimated, the lock may have one or more bolts, B, notched at b, and a series of combination and blank keys, D, and bolt-keys connecting to the bolts, which are adapted to be projected from one end of the lock-casing. In other words, each bolt-key may be connected to operate a single bolt, B, instead of a pair of aligned bolts, and the lock may be applied to single as well as double doors of vaults or safes provided with bolt-works controlled by the bolts of the lock. When the bolts B work in and out of one end of the lock-casing, the bolts may of course be arranged directly to enter the casing of the door for locking the door without the intervention of separate bolt-works and main locking-bolts, as will readily be understood.

Having thus described my invention, what I claim as new, and desire to secure by Letters Patent, is—

1. A lock comprising a bolt and key-frame grooved lengthwise and transversely, a bolt or series of bolts fitted to slide in the lengthwise grooves, and having transverse notches adapted to line with the transverse grooves of the frame, a series of keys fitted to slide in the transverse grooves of the frame and in the bolt-notches, and said keys having notches adapted to be lined with the lengthwise bolt-grooves of the frame, connections from the bolt or bolts to a key or keys, and means for moving the keys lengthwise, substantially as herein set forth.

2. A lock comprising a bolt and key-frame grooved lengthwise and transversely, one or more bolts fitted to slide in the lengthwise grooves, and having transverse notches adapted to line with the transverse grooves of the frame, a series of blank and combination keys fitted to slide in the transverse grooves of the frame and in the bolt-notches, and said keys having notches adapted to be lined with the lengthwise bolt-grooves of the frame, connections from the bolt or bolts to a sliding notched bolt key or keys, and means for moving the keys lengthwise, substantially as herein set forth.

3. A lock comprising a bolt and key-frame grooved lengthwise and transversely, one or more aligned pairs of bolts fitted to slide in the lengthwise grooves, and having transverse notches adapted to line with the transverse grooves of the frame, a series of keys fitted to slide in the transverse grooves of the frame and in the bolt-notches, and said keys having notches adapted to be lined with the lengthwise bolt-grooves of the frame, connections from each aligned pair of bolts to one of the sliding keys, and means for moving the keys lengthwise, substantially as herein set forth.

4. A lock comprising a bolt and key-frame grooved lengthwise and transversely, one or more aligned pairs of bolts fitted to slide in the lengthwise grooves, and having transverse notches adapted to line with the transverse grooves of the frame, a series of blank and combination keys fitted to slide in the transverse grooves of the frame and in the bolt-notches, and said keys having notches adapted to be lined with the lengthwise bolt-grooves of the frame, connections from each aligned pair of bolts to a notched bolt-key sliding in the frame, and means for moving the keys lengthwise, substantially as herein set forth.

5. A lock comprising a bolt and key-frame, C, grooved at c' c², one or more bolts or aligned pairs of bolts, B, notched at b, and fitted in a groove or grooves, c', a series of keys, D, fitted in grooves c², and comprising blank keys, whose notches d correspond with the bolt-grooves c' when said keys are fully pushed in or drawn out, one or more combination-keys having notches d, positioned to locate the tongues between them in the path of the bolt or bolts when said keys are fully pushed in, and a bolt-key connected to each bolt for projecting the bolt or bolts, a series of key-stems, E, fitted to slide in the door to which the lock is applied, and connected to the keys for operating them, and said key-stems having a series of marks or notches to indicate at the face of the door the extent of withdrawal of the combination-keys to permit the bolts to slide, substantially as herein set forth.

6. In a lock, the combination, with the grooved key-frame C, a series of blank and combination keys, D, notched at d, and a pair or pairs of aligned bolts, B, notched at b, substantially as specified, of the toggle-levers connecting each pair of aligned bolts to one notched bolt-key, substantially as herein set forth.

7. In a lock, the combination, with the grooved key-frame C, a series of keys, D, notched at d, one or more bolts, B, notched at b, and connections from the bolts to the bolt-keys, of the cap-plates G G, substantially as herein set forth.

8. In a lock, the bolt and key-frame C, made with lengthwise grooves c', and with transverse grooves c², opening along one side of the frame, and the bar F, rabbeted at the under side and forming a stop, f', in combination with the bolts and keys B D, placed in grooves $c'$ $c^2$, respectively, and means for connecting the bolts and keys, substantially as herein set forth.

9. A lock constructed with a key-frame, C, grooved at $c'$ $c^2$, one or more bolts, B, notched at $b$, and placed in a groove or grooves, $c'$, a series of keys, D, notched, as at $d$, and placed in grooves $c^2$, and a casing for the key-frame, bolts, and keys, in combination with key-stems E, held to slide in the door to which the lock is applied, and adapted to connect detachably with the forward ends of the keys D, substantially as herein set forth.

10. A lock constructed with a key-frame, C, grooved at $c'$ $c^2$, one or more bolts, B, notched at $b$, and placed in a groove or grooves, $c'$, a series of keys, D, notched, as at $d$, and placed in grooves $c^2$, and a casing for the key-frame, bolts, and keys, in combination with key-stems E, held to slide to a stop in the door to which the lock is applied, and adapted to connect detachably with the forward ends of the keys D, and a key connecting and disconnecting plate, K, substantially as herein set forth.

11. In a lock, the combination of the key-frame C, grooved at $c'$ $c^2$, the notched bolts B, and keys D, fitted to slide therein, a casing for the key-frame, bolts, and keys, the key-stems E, held to slide to a stop in the door to which the lock is applied, and adapted to connect detachably with the keys D, the key connecting and disconnecting plate K, and the key-connecting guide-bar L, substantially as herein set forth.

12. In a lock, the combination, with the notched key-frame C, notched bolts B, and keys D, fitted to slide therein, of a casing for the key-frame and its bolts and keys, said casing consisting of a bottom plate, H, having front end lugs, H', an upper plate, I, and a back plate, J, secured detachably to plates H I, to permit removal of the key-frame, substantially as herein set forth.

ANDREW JACKSON CALHOUN.

Witnesses:
GEORGE D. KENNEY,
F. A. THOMPSON.